United States Patent
Kunieda et al.

(10) Patent No.: US 7,871,689 B2
(45) Date of Patent: Jan. 18, 2011

(54) HONEYCOMB STRUCTURE (75) Inventors: Masafumi Kunieda, Gifu (JP); Yoshihiro Koga, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 12/246,881

(22) Filed: Oct. 7, 2008

(65) Prior Publication Data

US 2009/0246450 A1 Oct. 1, 2009

(30) Foreign Application Priority Data

Mar. 27, 2008 (JP) ............... PCT/JP2008/055975

(51) Int. Cl.
- B32B 3/12 (2006.01)
- C03C 3/095 (2006.01)
- B01J 23/10 (2006.01)
- B01J 29/04 (2006.01)
- B01D 39/00 (2006.01)
- B01D 46/00 (2006.01)
- B01D 39/06 (2006.01)

(52) U.S. Cl. .................. 428/116; 501/64; 502/304; 502/302; 502/60; 55/522; 55/523; 55/524

(58) Field of Classification Search .......... 428/116, 428/117, 118, 119; 501/64, 69, 72, 76, 78, 501/79, 103; 502/304, 302, 303, 60, 64, 502/67, 73; 55/522, 523, 524
See application file for complete search history.

(56) References Cited

U.S. PATENT DOCUMENTS 5,116,586 A * 5/1992 Baacke et al. ............ 423/239.2
2005/0266992 A1 * 12/2005 Ohno et al. ............... 502/439
2006/0043651 A1 * 3/2006 Yamamoto et al. ......... 264/661
2008/0118701 A1 5/2008 Ohno et al.
2008/0119355 A1 5/2008 Ohno et al.
2008/0176028 A1 7/2008 Ohno et al.
2008/0187713 A1 8/2008 Ohno et al.
2008/0241003 A1 10/2008 Ido et al.
2008/0241005 A1 10/2008 Ido et al.
2008/0241008 A1 10/2008 Ido et al.
2008/0260991 A1 10/2008 Konstandopoulos et al.

FOREIGN PATENT DOCUMENTS

| EP | 1961933 | 8/2008 |
|---|---|---|
| JP | 2004-322022 | 11/2004 |
| JP | 2006-183477 | 7/2006 |
| JP | 2007-296514 | 11/2007 |
| WO | 2005/063653 | 7/2005 |
| WO | 2008/101585 | 8/2008 |

* cited by examiner

Primary Examiner—Gordon R Baldwin
(74) Attorney, Agent, or Firm—Ditthavong Mori & Steiner, P.C.

(57) ABSTRACT

A honeycomb structure includes at least one honeycomb unit having a first end face and a second end face. The at least one honeycomb unit includes an inorganic binder, inorganic particles, and cell walls extending from the first end face to the second end face to define a plurality of cells. The inorganic particles include ceria particles doped with zirconia. A percentage by weight of zirconia doped in ceria in the ceria particles is in a range of about 20% to about 50%.

20 Claims, 4 Drawing Sheets

HONEYCOMB STRUCTURE

CROSS-REFERENCE TO RELATED APPLICATION

The present application claims priority under 35 U.S.C §119 to International Application No. PCT/JP2008/055975, filed Mar. 27, 2008, the entire contents of which are incorporated herein by reference.

BACKGROUND OF THE INVENTION

1. Field of the Invention

The present invention relates to a honeycomb structure.

2. Description of the Related Art

Conventionally, honeycomb structures are employed in exhaust gas treatment apparatuses used for treating NOx and the like in exhaust gases of automobiles (e.g. JP-A-2006-183477).

Such a honeycomb structure has, for example, plural cells (through-holes) extending in the longitudinal direction from one end face of the honeycomb structure to the other end face, and these cells are separated from each other by cell walls.

The cell walls of the honeycomb structure are made of ceramics, such as cordierite, and a NOx adsorbent material and an ammonia adsorbent material are provided on the cell walls. As the NOx adsorbent material, ceria or the like is used. On a layer constituted of the NOx adsorbent material, a noble metal catalyst, such as platinum, is supported. As the ammonia adsorbent material, zeolite or the like is used.

When the exhaust gas of an automobile or the like, for example, passes through such a honeycomb structure, NOx in the exhaust gas is converted according to the following cycle: in the case where the exhaust gas is an oxidizing atmosphere (for example, during normal operation of a diesel engine), NOx in the exhaust gas is adsorbed on the NOx adsorbent material; then, when the exhaust gas is switched to a reducing atmosphere (for example, during rich spike control of the diesel engine), the adsorbed NOx is reduced on the catalyst, resulting in producing ammonia, which is then adsorbed on the ammonia adsorbent material; and when the exhaust gas is switched back to an oxidizing atmosphere, NOx is reduced again with the use of the adsorbed ammonia, and if the adsorbed ammonia is consumed, then NOx is adsorbed on the NOx adsorbent material.

Accordingly, by passing the exhaust gases through a honeycomb structure, NOx in the exhaust gases can be converted. Meanwhile, honeycomb structures comprising inorganic particles, inorganic fibers and inorganic binder have come to be known (e.g. WO2005/063653A1).

The contents of JP-A-2006-183477 and WO2005/063653A1 are incorporated herein by reference.

SUMMARY OF THE INVENTION

According to one aspect of the present invention, a honeycomb structure includes at least one honeycomb unit having a first end face and a second end face. The at least one honeycomb unit includes an inorganic binder, inorganic particles, and cell walls extending from the first end face to the second end face to define a plurality of cells. The inorganic particles include ceria particles doped with zirconia. A percentage by weight of zirconia doped in ceria in the ceria particles is in a range of about 20% to about 50%.

DETAILED DESCRIPTION OF THE PREFERRED EMBODIMENTS

The following describes preferred embodiments of the present invention in reference to the drawings.

Figure 1:
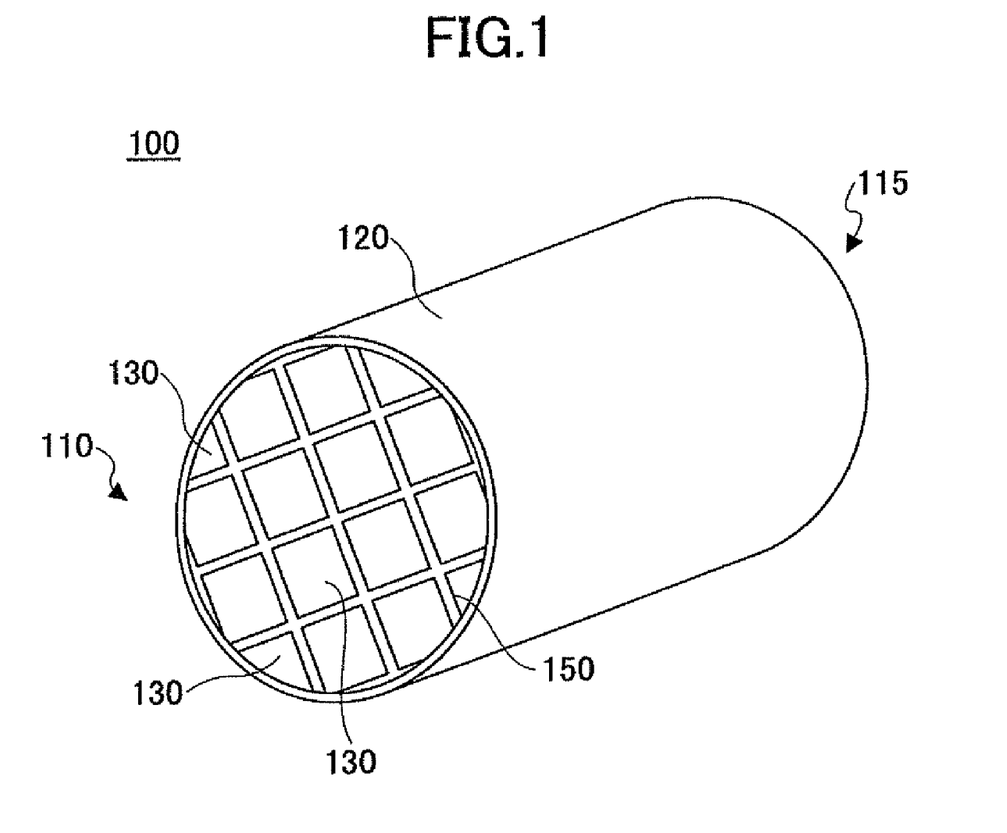
FIG. 1 is a perspective view schematically showing an example of a honeycomb structure of an embodiment of the present invention.
Figure 2:
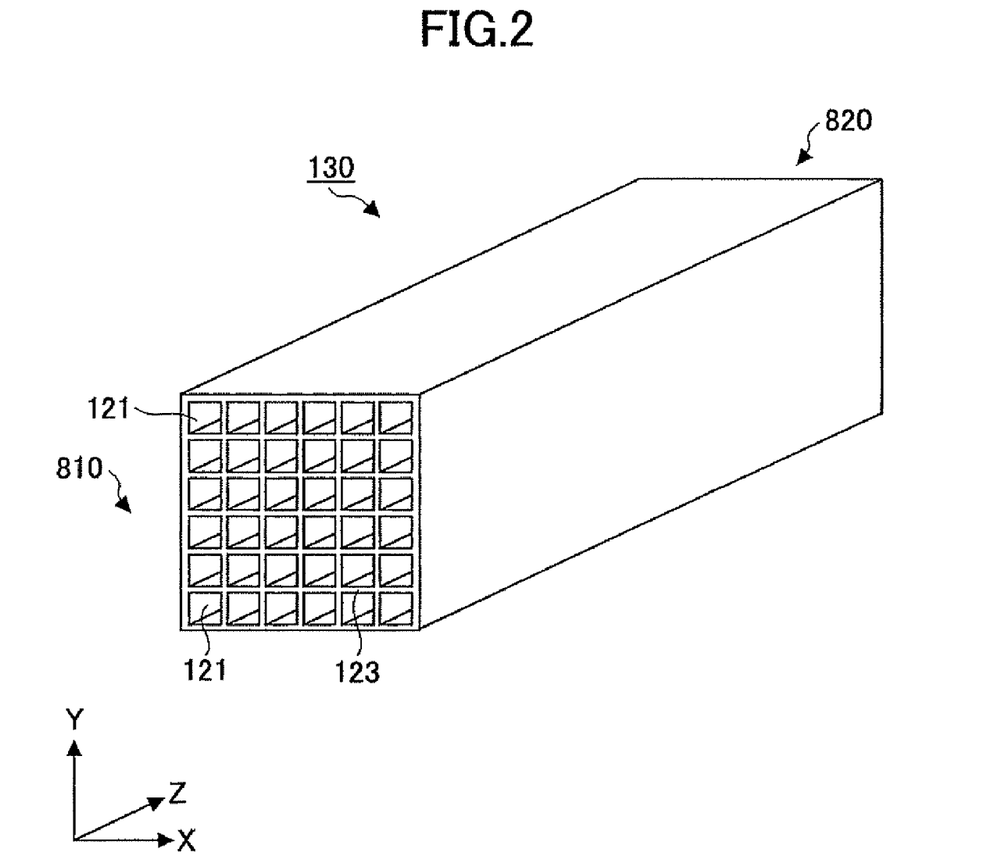
FIG. 2 is a perspective view schematically showing an example of a honeycomb unit constituting the honeycomb structure of FIG. 1.

FIG. 1 schematically shows a honeycomb structure of an embodiment of the present invention. FIG. 2 schematically shows an example of a honeycomb unit which is a basic unit of the honeycomb structure of FIG. 1.

As shown in FIG. 1, a honeycomb structure 100 of the embodiment of the present invention has two open faces 110 and 115. And a coat layer 120 is provided on the peripheral surface of the honeycomb structure 100, except on the end faces.

The honeycomb structure 100 is formed by, for example, joining plural pillar ceramic honeycomb units (one of which is shown in FIG. 2 as a honeycomb unit 130) by interposing an adhesive layer 150 (the example of FIG. 1 shows 16 honeycomb units arranged in four rows of four columns) and then applying a cutting process on the peripheral side of the joined honeycomb units to form the honeycomb structure into a predetermined shape (cylindrical in the example of FIG. 1).

As shown in FIG. 2, the honeycomb unit 130 has a first end 810 and a second end 820. The honeycomb unit 130 extends from the first end 810 to the second end 820 along its longitudinal direction, and has plural cells (through holes) 121 open at both ends and cell walls 123 separating these cells.

Here, for the purpose of bringing clarity to characteristic effects of the honeycomb structure 100 of the embodiment of the present invention, a configuration of a conventional honeycomb structure is described first.

The honeycomb structure of JP-A-2006-183477 is formed such that the basic framework materials are made of cordierite as mentioned above, and a NOx adsorbent material and an ammonia adsorbent material are supported on the surface of the cell walls.

Additionally, in the case of using the honeycomb structure disclosed in WO2005/063653A1 for the purpose of NOx adsorption as described above, the cell walls are primarily made, for example, of ceria particles.

However, when a honeycomb structure is used for converting the exhaust gases, microstructures which are supported on the honeycomb structure, or which constitute the honeycomb structure, tend to change over time. More specifically, the NOx adsorbent material is sintered by the heat of the exhaust gases, whereby its specific surface area tends to decrease over time. Furthermore, due to such change in the microstructures of the honeycomb structure, the NOx conversion performance of the honeycomb structure is likely to degrade over time.

Consequently, demand has been raised for a honeycomb structure having stable NOx treatment performance for long periods.

One embodiment of the present invention may be a honeycomb structure capable of maintaining more favorable NOx conversion performance compared to a conventional honeycomb structure, even after high temperature gases, such as exhaust gases, pass therethrough over an extended time period.

Figure 3:
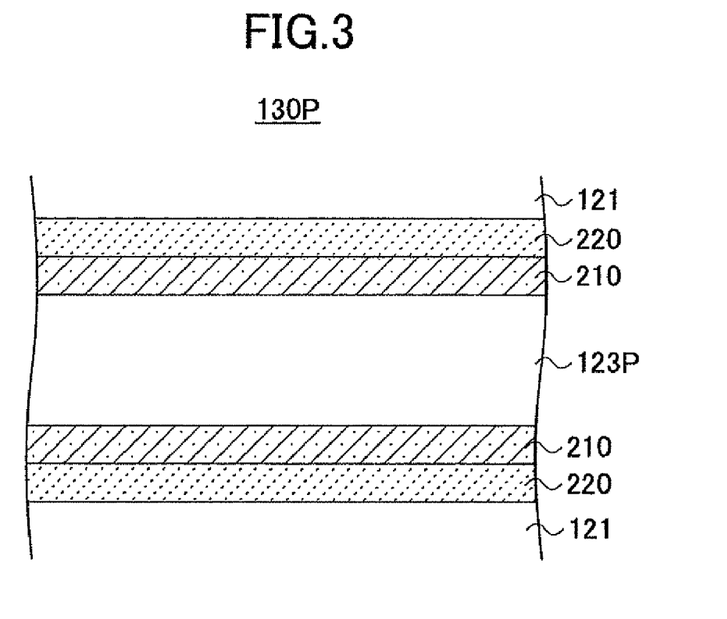
FIG. 3 schematically showing a cross sectional configuration of a cell wall of a conventional honeycomb structure.

FIG. 3 is an enlarged schematic diagram showing a cross section of a cell wall of a conventional honeycomb structure.

In a conventional honeycomb structure, a cell wall 123P of a honeycomb unit 130P is made of cordierite. On the cell wall 123P of the honeycomb unit 130P, a NOx adsorbent material 210 and an ammonia adsorbent material 220 are supported. The NOx adsorbent material 210 is constituted of ceria and a noble metal catalyst, such as platinum. On the other hand, the ammonia adsorbent material 220 is supported on the outer side of the NOx adsorbent material 210, and is generally constituted of a material such as zeolite. Note that it is obvious to one skilled in the art that, in practice, the NOx adsorbent material 210 and ammonia adsorbent material 220 are not formed in uniform (continuous) "layers" like shown in FIG. 3. That is, FIG. 3 schematically illustrates the cross sectional configuration to explain it in ways easy to understand, and it is therefore necessary to keep in mind that the drawn configuration is different from an actual one.

When a conventional honeycomb structure made of these material base is disposed in the exhaust gas line of a diesel engine and then the exhaust gas passes through the honeycomb structure for real, the following phenomena are observed.

First, when the exhaust gas is an oxidizing atmosphere (e.g. during normal operation of the diesel engine), NOx in the exhaust gas is adsorbed on the adsorbent material 210. Next, when rich spike control is performed to whereby switch the exhaust gas to a reducing atmosphere, $H_2$ which is produced after HC is converted by the catalyst and NOx which has been adsorbed on the NOx adsorbent material 210 produce ammonia by the reaction expressed by the following formula (1):

$2NO+3H_2 \rightarrow 2NH_3+O_2$     Formula (1).

Ammonia produced by the reaction is adsorbed on the ammonia adsorbent material 220 adjacent to the NOx adsorption layer 210.

On the other hand, when the exhaust gas is switched back to an oxidizing atmosphere (normal operation of the diesel engine), NOx in the exhaust gas is reduced by ammonia adsorbed on the ammonia adsorbent material 220, as expressed by the following formulae (2-1) and (2-2):

$4NH_3+4NO+O_2 \rightarrow 4N_2+6H_2O$     Formula (2-1);

$8NH_3+6NO_2 \rightarrow 7N_2+12H_2O$     Formula (2-2).

Subsequently, when ammonia adsorbed on the ammonia adsorbent material 220 is consumed, NOx is again adsorbed on the NOx adsorbent material 210. By repeating such a cycle, NOx is reduced. The exhaust gas whose NOx has been reduced reaches the other end of the cell 121, and is then discharged from the other end face of the honeycomb structure.

Thus, a conventional honeycomb structure allows treatment of NOx in the exhaust gas by the effects of the NOx adsorbent material 210 and ammonia adsorbent material 220 supported on the cell wall 123P of the honeycomb structure.

As a honeycomb structure performing such a NOx treatment, a honeycomb structure formed by using a NOx adsorbent material as its basic material can be employed. However, in the case where a honeycomb structure is used for conversion of the exhaust gas, microstructures which are supported on the honeycomb structure, or which constitute the honeycomb structure, tend to change over time. More specifically, the NOx adsorbent material is sintered by the heat of the exhaust gas, whereby its specific surface area is likely to decrease over time. Furthermore, due to such change in the microstructures of the honeycomb structure, the NOx conversion performance of the honeycomb structure is likely to degrade over time.

On the other hand, the honeycomb structure 100 of an embodiment of the present invention is characterized in that materials constituting the cell walls 123 primarily comprises zirconia-doped ceria.

As to zirconia-doped ceria particles, sintering among the particles tends to be less easily accelerated even under elevated temperature. Accordingly, the honeycomb structure 100 of the embodiment of the present invention, in which the cell walls 123 are formed by using zirconia-doped ceria particles as a basic material, is likely to be able to prevent a reduction in specific surface area of the cell walls 123 to a significant extent even when high temperature exhaust gases pass through the honeycomb structure 100 over a long period of time. Therefore, the honeycomb structure 100 of the embodiment of the present invention is likely to have less degradation in NOx adsorption performance and provide more stable NOx conversion performance for long periods compared to a conventional honeycomb structure.

As the details are given hereinafter, the honeycomb structure 100 of the embodiment of the present invention having the cell walls 123 primarily comprising zirconia-doped ceria has been observed to maintain more favorable NOx conversion performance compared to a conventional honeycomb structure (having the cell walls primarily comprising ceria, for instance), even after a heat treatment at about 600° C. for about five hours, for example.

In addition, the honeycomb structure 100 of the embodiment of the present invention is characterized in that the percentage by weight of zirconia doping in ceria (weight of zirconia/(weight of zirconia+weight of ceria)×100 [%]) falls the range of about 20% to about 50%. When the percentage by weight of zirconia doping in ceria is about 20% or more, the effect of doping of zirconia is likely to be obtained. That is, the effect of preventing degradation of the specific surface area in accordance with the operating time of the honeycomb structure is less likely to be smaller. On the other hand, when the percentage by weight of zirconia doping in ceria is about 50% or less, the honeycomb structure is less likely to show reduced NOx conversion performance. This is because the amount of ceria used in the NOx treatment reaction is less likely to be decreased. Accordingly, the percentage by weight of zirconia doping in ceria is preferably in the range of about 20% and about 50%, whereby the honeycomb structure 100 is likely to be able to maintain favorable NOx conversion performance over the long term. Furthermore, the percentage by weight of zirconia doping in ceria is more preferably in the range of about 30% and about 40%.

Figure 4:
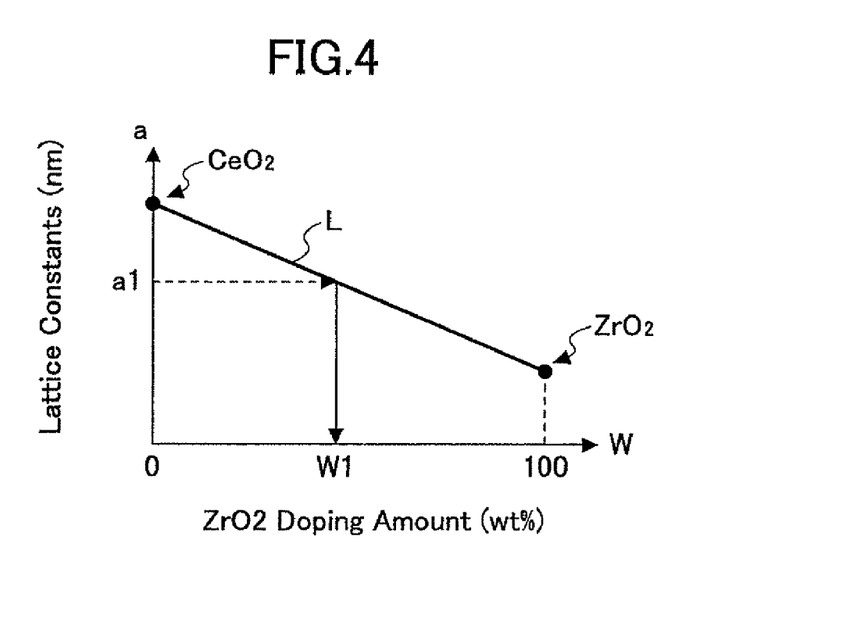
FIG. 4 is a graph schematically showing a relationship between the doping amount of zirconia and lattice constants.

In the present application, the percentage by weight of zirconia doping in ceria is calculated by the following method. FIG. 4 schematically shows the process of such calculation.

(i) When the horizontal axis represents the doping amount of zirconia in ceria W (weight of zirconia/(weight of zirconia+weight of ceria)) [wt %] and the vertical axis represents lattice constants a [nm], lattice constants for pure ceria (W=0) and for pure zirconia (W=100) are respectively plotted (refer to black dots in FIG. 4).

(ii) Assume that Vegard's law exists between the doping amount of zirconia "W" and the lattice constants "a" of ceria doped with that doping amount of zirconia, and the aforementioned two dots are connected by a straight line (straight line L of FIG. 4).

(iii) A lattice constants "a1" is obtained for a sample which is a measuring object of the doping amount of zirconia. Based on the results of X-ray diffraction of the sample, the lattice constants "a1" is calculated from the shift of the first peak of the sample with respect to the first peak of pure ceria.

(iv) By using the relationship of the straight line L, as shown in FIG. 4, an amount of zirconia doping in ceria "W1" can be obtained.

Figure 5:
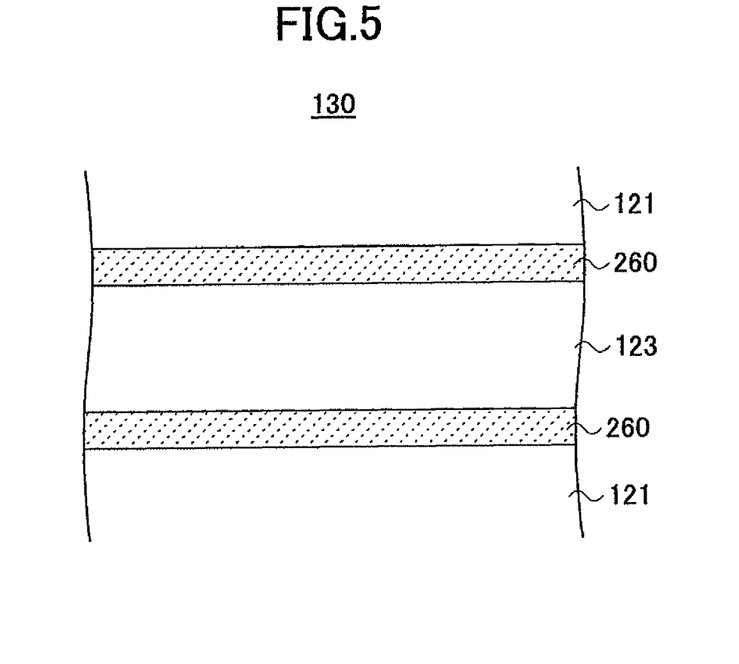
FIG. 5 schematically shows a cross sectional configuration of a cell wall of the honeycomb structure of the embodiment of the present invention.

FIG. 5 is an enlarged schematic diagram showing a cross section of a cell wall of the honeycomb structure 100 according to the embodiment of the present invention.

In the honeycomb structure 100 of the embodiment of the present invention, ceria doped with zirconia is used as a material constituting the cell walls 123 of the honeycomb unit 130. It is known that, as described above, ceria can be used as a NOx adsorbent material in the conversion of NOx in the exhaust gases. In the embodiment of the present invention, a noble metal catalyst to be hereinafter described and an ammonia adsorbent material 260 (corresponding to the conventional ammonia adsorbent material 220) are supported on the cell walls 123, as shown in FIG. 5.

The ammonia adsorbent material 260 may include zeolite, for example. Here, zeolite may take any structure, for example, β-type, Y-type, ferrierite, ZSM-5, mordenite, faujasite, zeolite A, zeolite L or the like.

Furthermore, a noble metal catalyst (not shown in FIG. 5) is supported on the cell walls 123 of the honeycomb unit 130 as described above. The noble metal catalyst is not particularly limited, and platinum, palladium, rhodium or the like can be used, for example. The supporting amount of noble metal catalyst is in the range, for instance, of about 0.5 g/L to about 5 g/L. Note that the noble metal catalyst is preferably supported on the cell walls 123 prior to the ammonia adsorbent material 260 being supported thereon.

According to the embodiment of the present invention, the honeycomb unit 130 includes inorganic binder, in addition to ceria particles doped with zirconia. The honeycomb unit 130 of the embodiment of the present invention may also include inorganic fibers.

For the inorganic binder, inorganic sol, clay base binder and the like may be used. Specific examples of such inorganic sol are alumina sol, silica sol, titania sol and liquid glass. Specific examples of the clay base binder are clays of double-chain structure, such as white earth, kaolin, montmorillonite, sepiolite and attapulgite. One kind selected from these clays may solely be used, or two or more kinds may be used together.

Among the above-mentioned inorganic materials of the inorganic binder, it is preferable to use at least one selected from the group consisting of alumina sol, silica sol, titania sol, liquid glass, sepiolite and attapulgite.

In the case when inorganic fibers are added to the honeycomb unit 130, a desirable material of such inorganic fibers is alumina, silica, silicon carbide, silica-alumina, glass, potassium titanate, aluminum borate or the like. One kind selected from them may solely be used, or two or more kinds may be used together. Among them, alumina fibers are preferable.

As to the total amount of the inorganic particles included in the honeycomb unit 130, a lower limit is preferably about 30 wt %, more preferably about 40 wt %, and further preferably about 50 wt %. On the other hand, an upper limit is preferably about 90 wt %, more preferably about 80 wt %, and further preferably about 75 wt %. When the total amount of the inorganic particles is about 30 wt % or more, the amount of inorganic particles contributing to the NOx conversion is less likely to be relatively reduced. On the other hand, when the total amount of the inorganic particles is about 90 wt % or less, the strength of the honeycomb unit is less likely to be reduced.

As to the amount of the inorganic binder included in the honeycomb unit, a lower limit is preferably about 5 wt % or more as solids content, more preferably about 10 wt % or more, and further preferably about 15 wt % or more. On the other hand, an upper limit is preferably about 50 wt % or less as solids content, more preferably about 40 wt % or less, and further preferably about 35 wt % or less. When the content of the inorganic binder is about 5 wt % or more as solids content, the strength of the manufactured honeycomb unit is less likely to be reduced. On the other hand, when the content is 50 wt % or less as solids content, the forming processability of the raw material composition is less likely to be reduced.

In the case when inorganic fibers are included in the honeycomb unit, a lower limit of the total amount of the inorganic fibers is preferably about 3 wt %, more preferably about 5 wt %, and further preferably about 8 wt %. On the other hand, an upper limit is preferably about 50 wt %, more preferably about 40 wt %, and further preferably about 30 wt %. When the content of the inorganic fibers is about 3 wt % or more, the contribution of the inorganic fibers to improving the strength of the honeycomb unit is less likely to be diminished, and when the content is about 50 wt % or less, the amount of inorganic particles contributing to the NOx conversion is less likely to be relatively reduced.

Regarding the honeycomb unit 130, the shape of a cross section cut perpendicular to the longitudinal direction is not particularly limited, and it may take any shape, provided honeycomb units 130 can be joined by interposing an adhesive layer. The shape of the honeycomb unit 130 cross section may be square, rectangular, hexagonal, fan-shaped or the like.

In addition, the shape of a cross section of the cell 121 cut perpendicular to the longitudinal direction is also not particularly limited. Therefore, the shape is not limited to square, and may be triangular or polygonal, for example.

The cell density of the honeycomb unit 130 preferably ranges from about 15.5 cells/cm$^2$ to about 186 cells/cm$^2$ (about 100 cpsi to about 1200 cpsi), more preferably ranging from about 46.5 cells/cm$^2$ to about 170 cells/cm$^2$ (about 300 cpsi to about 1100 cpsi), and further preferably ranging from about 62.0 cells/cm$^2$ to about 155 cells/cm$^2$ (about 400 cpsi to about 1000 cpsi).

The thickness of the cell wall 123 of the honeycomb unit 130 is not particularly limited, yet a preferable lower limit is about 0.1 mm in view of the strength and a preferable upper limit is about 0.4 mm.

The honeycomb structure 100 of the embodiment of the present invention may take any shape. For example, besides a cylindrical shape as shown in FIG. 1, the honeycomb structure 100 may be cylindroid, square pillar, polygonal pillar or the like, for example.

As to the coat layer 120 of the honeycomb structure 100, its raw material is a paste (a coat layer paste) including organic binders in addition to inorganic particles, inorganic binders and inorganic fibers. For the inorganic particles, particles of alumina, silica, zirconia, titania, ceria, mullite, zeolite and the like are used. One kind selected from these particles may solely be used as the inorganic particles, or two or more kinds may be used together. For the inorganic fibers and inorganic binders, the aforementioned substances can be used. For the organic binders, polyvinyl alcohol, methylcellulose, ethyl cellulose, carboxylmethylcellulose, or the like may be used. One kind selected from them may solely be used, or a mixture of two or more kinds may be used instead. Among these organic binders, carboxylmethylcellulose is preferable.

Subsequently, the coat layer paste is applied on the outer peripheral surface of the honeycomb structure 100, and then dried and solidified to form a coat layer 120. Pore-forming agents, such as spherical acrylic particles, graphite, and balloons which are hollow microspheres comprising oxide base ceramic, may be added to the raw material paste if needed. The thickness of the coat layer 120 is preferably about 0.1 mm to about 2.0 mm.

In the honeycomb structure 100 of the embodiment of the present invention, the same material for the coat layer 120 is used for the adhesive layers 150. Note however that a different material from that of the coat layer 120 may be used for the adhesive layers 150.

The above description is given of an example of the honeycomb structure 100 of one embodiment of the present invention formed by joining plural honeycomb units 130 by interposing the adhesive layers 150, like one shown in FIG. 1.

Figure 6:
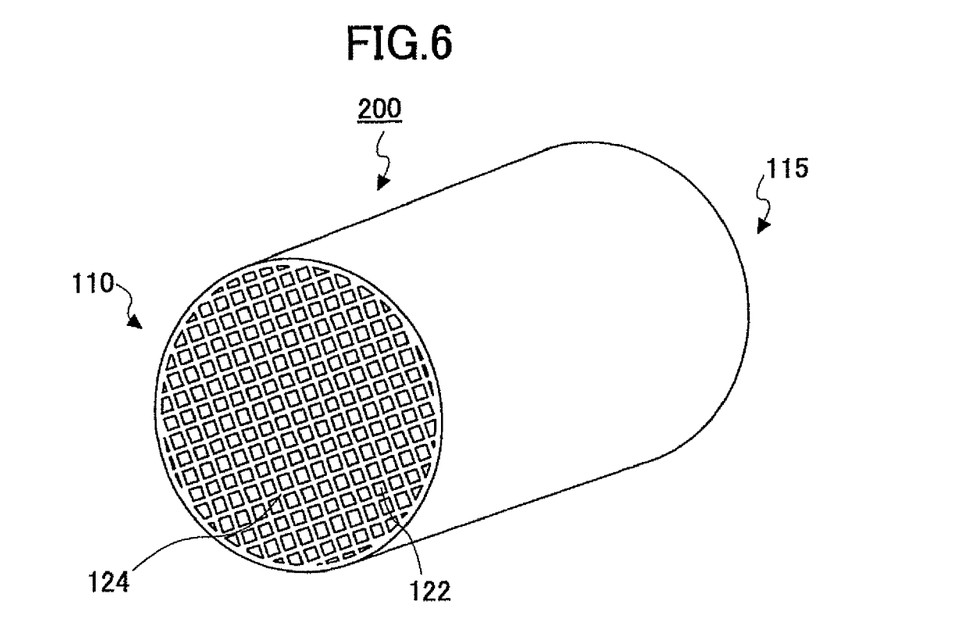
FIG. 6 is a perspective view schematically showing another example of the honeycomb structure of an embodiment of the present invention.

FIG. 6 shows another example of a honeycomb structure of an embodiment of the present invention. A honeycomb structure 200 is the same as the honeycomb structure 100, except that the honeycomb structure 200 is formed of a single honeycomb unit in which plural cells 122 are arranged parallel to each other in the longitudinal direction, separated by cell walls 124. Note that a coat layer may or may not be provided on the outer peripheral surface of the honeycomb structure 200.

These honeycomb structures 100 and 200 are applicable to apparatuses for treating the exhaust gases emitted from diesel engines, for example.

[Method of Manufacturing Honeycomb Structure]

Next is described an example of the method of manufacturing the honeycomb structure of an embodiment of the present invention.

First, a honeycomb unit molded body is made by, for example, extrusion molding using a raw material paste that comprises primarily inorganic particles and inorganic binder and may also include inorganic fibers which may be added on an as-needed basis. The inorganic particles primarily include ceria particles doped with zirconia.

Ceria particles doped with zirconia can be prepared by a so-called homogeneous precipitation method, for example, according to the following procedure.

First, an aqueous solution is prepared by dissolving cerium nitrate in water. In this aqueous solution, a zirconium nitrate solution is mixed at a pH of about 3 to about 5. The zirconium concentration in the zirconium nitrate solution is calculated from the doping amount of zirconia finally obtained (namely, the molar quantity of zirconium included in the zirconium nitrate solution=the molar quantity of zirconia doping in ceria). Next, an aqueous solution of urea is mixed into the previously mixed aqueous solution, which is then heated. By this operation, the hydrolysis reaction occurs in the solution, whereby $NH_3$ is produced and the pH rises to about 7 to about 9. Then, a deposit formed is collected and dried, which leads to production of ceria doped with a predetermined amount of zirconia.

In addition to these inorganic materials, organic binders, dispersion media and shaping aids may be added to the raw material paste according to the formability of the raw material paste. The kinds of the organic binders are not particularly limited, and examples of such are one or more kinds of organic binders selected from methylcellulose, carboxylmethylcellulose, hydroxylethylcellulose, polyethylene glycol, phenolic resin, epoxy resin and the like. The relative quantity of the organic binders to be blended is preferably about 1 wt % to about 10 wt % when the total of the inorganic particles, inorganic binders and inorganic fibers is 100 wt %.

The kinds of the dispersion media are not particularly limited, and examples of such are water, organic solvents (e.g. benzene), and alcohols (e.g. methanol). The kinds of the shaping aids are not particularly limited, and examples of such are ethylene glycols, dextrins, fatty acids, fatty acid soaps and polyalcohols.

The raw material paste is not particularly limited, but is preferably mixed, kneaded and the like. For instance, the paste may be mixed using a mixer, attriter or the like, or may be sufficiently kneaded by a kneader or the like. The method of forming and shaping the raw material paste is not particularly limited; however, it is preferable to form a shape having cells by, for example, extrusion molding or the like.

Next, the resultant molded body is preferably dried. A drying apparatus used to dry the molded body is not particularly limited, and examples of such are a microwave drying apparatus, a hot air drying apparatus, a dielectric drying apparatus, a reduced-pressure drying apparatus, a vacuum drying apparatus and a freeze drying apparatus. Also, the resultant molded body is preferably degreased. Degreasing conditions are not particularly limited and should be appropriately determined according to the kinds and amounts of organic substances included in the molded body; however, the molded body is degreased preferably at about 400° C. for about two hours. Furthermore, the resultant molded body is preferably fired. Firing conditions are not particularly limited; however, the molded body is fired preferably at about 600° C. to about 1200° C., and more preferably at about 600° C. to about 1000° C. This is because, if the firing temperature is about 600° C. or more, sintering is likely to be progressed, which is less likely to lead to a reduction in the strength of the honeycomb unit 130. On the other hand, if the firing temperature is about 1200° C. or less, sintering is less likely to be excessively progressed, which is less likely to lead to a decrease in the specific surface area of the honeycomb unit 130 per unit volume.

Next, a noble metal catalyst is supported on the cell walls of the resultant honeycomb unit 130. The noble metal catalyst is not particularly limited, and platinum, palladium, rhodium or the like can be used, for instance. The noble metal catalyst can be supported on the cell walls 123 by, for example, impregnating the honeycomb unit 130 in a nitric acid solution which includes platinum ions.

Then, the ammonia adsorbent material 260 is supported on the cell walls 123 of the honeycomb unit 130. The ammonia adsorbent material 260 comprises zeolite, for instance. The ammonia adsorbent material 260 can be supported on each cell wall by, for example, impregnating the honeycomb unit 130 in a solution which includes an ammonia adsorbent material 260.

Subsequently, an adhesive layer paste to be later formed as an adhesive layer is applied at a uniform thickness on the lateral surface of the honeycomb unit 130 that has been obtained from the previous process. Then, other honeycomb units 130 are sequentially stacked on top of the honeycomb unit 130 by interposing the adhesive layer paste. By repeating this process, a honeycomb structure of a desired size (e.g. honeycomb units arranged in 4 rows and 4 columns) is manufactured.

The adhesive layer paste is not particularly limited, and examples of such are a mixture of inorganic binder and inorganic particles, a mixture of inorganic binder and inorganic fibers, and a mixture of inorganic binder, inorganic particles and inorganic fibers. Furthermore, organic binder may be added to these mixtures. The kinds of the organic binder are not particularly limited, and examples of such are one or more kinds selected from polyvinyl alcohols, methylcellulose, ethyl cellulose, carboxylmethylcellulose and the like.

The thickness of the adhesive layer joining the honeycomb units is preferably about 0.3 mm to about 2 mm. This is because, if the adhesive layer is about 0.3 mm or more in thickness, sufficient bonding strength is likely to be obtained. On the other hand, the adhesive layer with about 2 mm or less in thickness is less likely to increase pressure loss. Note that the number of honeycomb units to be joined is determined according to the size of the honeycomb structure.

Next, the honeycomb structure is heated to dry and solidify the adhesive layer paste, whereby the adhesive layer is formed and also the honeycomb units are firmly fixed to each other.

Subsequently, a cutting process is performed on the honeycomb structure 100 to form it into, for example, a cylindrical shape using a diamond cutter or the like, to thereby manufacture the honeycomb structure 100 having a desired peripheral shape.

Then, after a coat layer paste is applied on the peripheral surface (lateral surface) of the honeycomb structure 100, the coat layer paste is dried and solidified to form a coat layer. The coat layer paste is not particularly limited, and the same paste as the adhesive layer paste may or may not be used as the coat layer paste. In addition, the coat layer paste may or may not have the same compounding ratio of that of the adhesive layer paste. The thickness of the coat layer is not particularly limited.

The honeycomb structure 100 is preferably heat-treated after the plural honeycomb units are joined by the adhesive layer (N.B. in the case of providing the coat layer, this heat treatment is performed after a coat layer is formed). By the degreasing treatment, in the case where organic binders are included in the adhesive layer paste and coat layer paste, the organic binders are degreased. Degreasing conditions are appropriately determined according to the kinds and amounts of organic substances included in the pastes; however, in the usual case, degreasing is carried out at about 700° C. for about two hours.

According to the above described procedure, the honeycomb structure 100 shown in FIG. 1 can be manufactured.

EXAMPLES

Next are described examples of an embodiment of the present invention.

Example 1

First, 2180 parts by weight of ceria particles doped with zirconia (average particle diameter 2 μm), 500 parts by weight of alumina particles (average particle diameter 2 μm), 345 parts by weight of alumina fibers (average fiber diameter 6 μm, average fiber length 100 μm), and 2200 parts by weight of alumina sol (solids content 30 wt %) were mixed together. To the resultant mixture, 320 parts by weight of methylcellulose as an organic binder, as well as small amounts of plasticizer, surfactant and lubricant agent were added, and then further mixed and kneaded to obtain a mixed composition. Subsequently, extrusion molding was performed by an extrusion molding machine using the mixed composition to thereby obtain a raw molded body. Note that the ceria particles doped with zirconia were prepared by the aforementioned method (homogeneous precipitation method). The doping amount of zirconia obtained by the calculation method described above (weight of zirconia/(weight of zirconia+weight of ceria)×100 [%]) was 20% by weight.

Next, the raw molded body was sufficiently dried using a microwave drying apparatus and a hot air drying apparatus, and then subjected to a degreasing process at 400° C. for two hours. The raw molded body was subsequently fired at 700° C. for two hours to thereby obtain a porous square pillar honeycomb unit (Height 35 mm×Width 35 mm×Length 150 mm). The cell density of the porous honeycomb unit was 93 cells/cm$^2$ and the cell wall was 0.2 mm in thickness.

Then, using a diamond cutter, a cutting process was further performed on the porous square pillar honeycomb unit along the axis direction to obtain a porous cylindrical honeycomb unit (Diameter 25 mm×Length 60 mm) to be used as an evaluation sample.

Subsequently, the resultant cylindrical honeycomb unit (evaluation sample) was impregnated with a platinum nitric acid solution, and then kept at 600° C. for one hour. By this treatment, platinum was applied on the cell walls. The weight of platinum per unit volume of the cylindrical honeycomb unit was 3 g/L.

Next, zeolite was applied on the cell walls of the cylindrical honeycomb unit (evaluation sample) by an impregnation process. The weight of zeolite per unit volume of the cylindrical honeycomb unit was 55 g/L.

Then, the honeycomb unit (evaluation sample) was placed in an atmospheric furnace and heat-treated at 650° C. for five hours.

Example 2

Next, a honeycomb unit (evaluation sample) of Example 2 was manufactured by the same method as Example 1. Note however that Example 2 differs from Example 1 in that the percentage by weight of zirconia doping in ceria (weight of zirconia/(weight of zirconia+weight of ceria)×100 [%]) was 30%.

Then, the honeycomb unit (evaluation sample) was placed in the atmospheric furnace and heat-treated at 650° C. for five hours.

Example 3

Next, a honeycomb unit (evaluation sample) of Example 3 was manufactured by the same method as Example 1. Note however that Example 3 differs from Example 1 in that the percentage by weight of zirconia doping in ceria (weight of zirconia/(weight of zirconia+weight of ceria)×100 [%]) was 40%.

Then, the honeycomb unit (evaluation sample) was placed in the atmospheric furnace and heat-treated at 650° C. for five hours.

Example 4

Next, a honeycomb unit (evaluation sample) of Example 4 was manufactured by the same method as Example 1. Note however that Example 4 differs from Example 1 in that the percentage by weight of zirconia doping in ceria (weight of zirconia/(weight of zirconia+weight of ceria)×100 [%]) was 50%.

Then, the honeycomb unit (evaluation sample) was placed in the atmospheric furnace and heat-treated at 650° C. for five hours.

Comparative Example 1

Next, a honeycomb unit (evaluation sample) of Comparative Example 1 was manufactured by the same method as Example 1. Note however that Comparative Example 1 differs from Example 1 in that ceria particles not doped with zirconia were used.

Then, the honeycomb unit (evaluation sample) was placed in the atmospheric furnace and heat-treated at 650° C. for five hours.

Comparative Example 2

Next, a honeycomb unit (evaluation sample) of Comparative Example 2 was manufactured by the same method as Example 1. Note however that Comparative Example 2 differs from Example 1 in that the percentage by weight of zirconia doping in ceria (weight of zirconia/(weight of zirconia+weight of ceria)×100 [%]) was 70%.

Then, the honeycomb unit (evaluation sample) was placed in the atmospheric furnace and heat-treated at 650° C. for five hours.

TABLE 1

| Gas Component | Gas Concentration Lean-Burn Operation | Rich Spike Control |
|---|---|---|
| $CO_2$ | 6 vol % | 6 vol % |
| $O_2$ | 6 vol % | — |
| NO | 110 ppm | 110 ppm |
| CO | 500 ppm | 2% |
| THC (hydrocarbon) | 900 ppm* | 900 ppm* |
| $H_2O$ | 7 vol % | 7 vol % |
| $N_2$ | Balance | Balance |
| SV | 50000/hr | 47000/hr |

*based on the amount of carbon

For the measurements of NO concentrations, an apparatus made by Horiba Ltd. (MEXA-7100D) was used. The NO detection limit of the apparatus is 0.1 ppm.

The test temperature (honeycomb unit (evaluation sample) and gas temperature) was 200 to 400° C., and was maintained constant during the test.

To evaluate NOx treatment performance, a NOx conversion rate N was used. The NOx conversion rate N was calculated by the following equation:

$N(\%)$={(NO concentration in mixed gases before being introduced into honeycomb unit)−(NO concentration in exhaust gases discharged from honeycomb unit)}/(NO concentration in mixed gases before being introduced into honeycomb unit)×100 (3).

The results of the evaluation test of NOx treatment performance are shown in Table 2.

TABLE 2

| | Amount of Zirconia Doping in Ceria (%) $\left(\frac{\text{(weight of zirconia)}}{\text{(weight of zirconia+ weight of ceria)}}\right) \times 100$ | NOx Conversion Rate (%) | | |
|---|---|---|---|---|
| | | 200° C. | 300° C. | 400° C. |
| Example 1 | 20 | 97 | 93 | 83 |
| Example 2 | 30 | 98 | 94 | 85 |
| Example 3 | 40 | 97 | 94 | 84 |
| Example 4 | 50 | 94 | 91 | 80 |
| Comp. Ex. 1 | 0 | 90 | 87 | 76 |
| Comp. Ex. 2 | 70 | 88 | 84 | 70 |

[Evaluation of NOx Treatment Performance]

Evaluation of the NOx treatment performance was carried out using heat-treated honeycomb units (evaluation samples) of Examples 1-4 and Comparative Examples 1-2 manufactured by the above-described method. The evaluation was made by conducting NOx treatment where mixed gases which simulate the exhaust gases of vehicular diesel engines during lean-burn operation and rich spike control were passed through each honeycomb unit (evaluation sample), and then measuring the amount of NO (nitric oxide) included in gases discharged from the honeycomb unit (evaluation sample).

Table 1 shows compositions of the gases during lean-burn operation and during rich spike control. In the evaluation test, a cycle of first introducing the lean gas into the honeycomb unit (evaluation sample) for 55 seconds, and then introducing the rich gas for 5 seconds was repeated until the NO concentration in the exhaust gases started showing little change.

The results reveal that, for Comparative Examples 1 and 2, their NOx conversion rates N were low especially at 400° C., being less than 80%. On the other hand, regarding all honeycomb units (evaluation samples) of Examples 1-4, their NOx conversion rates N exceeds 80% regardless of the test temperature. Thus, the honeycomb structure 100 of the embodiment of the present invention was demonstrated to have favorable NOx conversion performance even after heat treatment. In particular, Examples 2 and 3 where the percent by weight of zirconia doping in ceria is between 30% and 40% are believed to deliver highly favorable NOx conversion performance at any test temperature.

What is claimed is:

1. A honeycomb structure comprising:
   at least one honeycomb unit having a first end face and a second end face, the at least one honeycomb unit comprising:

a cell wall extending from the first end face to the second end face to define a plurality of cells;
an inorganic binder; and
a plurality of inorganic particles,
wherein the cell wall primarily comprises a plurality of ceria particles doped with zirconia, and
a percentage by weight of the zirconia in the ceria particles is in a range of about 20% to about 50%.

2. The honeycomb structure as claimed in claim 1, wherein the percentage by weight of the zirconia in the ceria particles is in a range of about 30% to about 40%.

3. The honeycomb structure as claimed in claim 1, wherein the inorganic particles further comprise zeolite.

4. The honeycomb structure as claimed in claim 1, wherein a noble metal is supported on the cell wall.

5. The honeycomb structure as claimed in claim 4, wherein the noble metal is at least one of platinum, palladium and rhodium.

6. The honeycomb structure as claimed in claim 4, wherein an amount of the noble metal is in a range of about 0.5 g/L to about 5 g/L.

7. The honeycomb structure as claimed in claim 1, further comprising zeolite supported on the cell wall.

8. The honeycomb structure as claimed in claim 7, wherein zeolite has one structure of β-type, Y-type, ferrierite, ZSM-5, mordenite, faujasite, zeolite A and zeolite L.

9. The honeycomb structure as claimed in claim 1, wherein the inorganic binder is an inorganic sol or a clay-based binder.

10. The honeycomb structure as claimed in claim 9, wherein the inorganic binder comprises at least one of alumina sol, silica sol, titania sol, liquid glass, sepiolite and attapulgite.

11. The honeycomb structure as claimed in claim 1, wherein the at least one honeycomb unit further comprises an inorganic fiber.

12. The honeycomb structure as claimed in claim 11, wherein the inorganic fiber is at least one of alumina, silica, silicon carbide, silica alumina, glass materials, potassium titanate and aluminum borate.

13. The honeycomb structure as claimed in claim 1, wherein the at least one honeycomb unit comprises the inorganic particles in a range of about 30 wt % to about 90 wt % in total.

14. The honeycomb structure as claimed in claim 1, wherein the at least one honeycomb unit comprises the inorganic binder as a solid content in a range of about 5 wt % to about 50 wt %.

15. The honeycomb structure as claimed in claim 11, wherein the at least one honeycomb unit comprises the inorganic fiber in a range of about 3 wt % to about 50 wt % in total.

16. The honeycomb structure as claimed in claim 1, wherein the at least one honeycomb unit comprises a plurality of honeycomb units, and wherein the honeycomb structure further comprises an adhesive layer joining the plurality of honeycomb units.

17. The honeycomb structure as claimed in claim 1, wherein the at least one honeycomb unit comprises a single honeycomb unit.

18. The honeycomb structure as claimed in claim 1, wherein a cell density of the at least one honeycomb unit is in a range of about 15.5 cells/cm$^2$ to about 186 cells/cm$^2$.

19. The honeycomb structure as claimed in claim 1, wherein a thickness of the cell wall is in a range of about 0.1 mm to about 0.4 mm.

20. The honeycomb structure as claimed in claim 1, wherein the ceria particles doped with the zirconia have a lattice constant between a lattice constant of pure ceria and a lattice constant of pure zirconia.

* * * * *